United States Patent [19]

Wiley et al.

[11] Patent Number: 5,206,747
[45] Date of Patent: Apr. 27, 1993

[54] POLYMER DISPERSED LIQUID CRYSTAL DISPLAY WITH BIREFRINGENCE OF THE LIQUID CRYSTAL AT LEAST 0.23

[75] Inventors: Richard C. Wiley, Los Altos; Paul S. Drzaic, Palo Alto, both of Calif.

[73] Assignee: Taliq Corporation, Sunnyvale, Calif.

[21] Appl. No.: 811,310

[22] Filed: Dec. 20, 1991

Related U.S. Application Data

[63] Continuation-in-part of Ser. No. 705,824, May 28, 1991, abandoned, which is a continuation of Ser. No. 490,643, May 23, 1990, abandoned, which is a continuation-in-part of Ser. No. 250,435, Sep. 28, 1988, abandoned.

[51] Int. Cl.$^5$ .................... G02F 1/13; G02F 1/1335
[52] U.S. Cl. ........................... 359/51; 359/70; 359/98
[58] Field of Search ..................... 359/51, 70, 98

[56] References Cited

U.S. PATENT DOCUMENTS

| | | | |
|---|---|---|---|
| 3,960,751 | 6/1976 | Moriyama et al. | 359/84 |
| 4,211,473 | 7/1980 | Shanks | 359/70 |
| 4,435,047 | 3/1984 | Fergason | 359/52 |
| 4,556,289 | 12/1985 | Fergason | 359/52 |
| 4,591,233 | 5/1986 | Fergason | 359/52 |
| 4,596,445 | 6/1986 | Fergason | 359/52 |
| 4,605,284 | 8/1986 | Fergason | 359/98 |
| 4,606,611 | 8/1986 | Fergason | 359/52 |
| 4,616,903 | 10/1986 | Fergason | 359/52 |
| 4,643,528 | 2/1987 | Bell, Jr. | 359/52 |
| 4,662,720 | 5/1987 | Fergason | 359/52 |
| 4,688,900 | 8/1987 | Doane | 359/52 |
| 4,693,557 | 9/1987 | Fergason | 359/51 |
| 4,707,080 | 11/1987 | Fergason | 359/52 |
| 4,765,719 | 8/1988 | Fergason | 359/51 |
| 4,780,531 | 10/1988 | Kano et al. | 252/299.1 |
| 4,810,063 | 3/1989 | Fergason | 359/51 |
| 4,890,902 | 1/1990 | Doane et al. | 359/52 |
| 4,992,201 | 2/1991 | Pearlman | 359/52 |
| 5,107,352 | 4/1992 | Fergason | 359/51 |
| 5,150,232 | 9/1992 | Gunkima et al. | 359/51 |

FOREIGN PATENT DOCUMENTS

| | | |
|---|---|---|
| 0156615 | 10/1985 | European Pat. Off. . |
| 0134452 | 10/1979 | Japan . |
| 0002823 | 1/1983 | Japan . |
| 0193523 | 11/1983 | Japan . |
| 2019026 | 10/1979 | United Kingdom . |
| 85-04262 | 9/1985 | World Int. Prop. O. . |
| 90-03593 | 4/1990 | World Int. Prop. O. . |

OTHER PUBLICATIONS

B. Wu et al, "Angular discrimination of light transmission through polymer-dispersed liquid-crystal films", Journal of Applied Physics, vol. 62, No. 9, Nov. 1987, pp. 3925–3931.

Drzaic, P. S., "Polymer Dispersed Nematic Liquid Crystal for Large Area Displays and Light Valves", Journal of Applied Physics, vol. 60, No. 6, pp. 2142–2148, Sep. 1986.

Primary Examiner—William L. Sikes
Assistant Examiner—Anita Pellman Gross
Attorney, Agent, or Firm—Heller, Ehrman, White & McAuliffe

[57] ABSTRACT

A liquid crystal apparatus (30) comprising a containment medium (56), a birefringent liquid crystal material (38) and a pleochroic dye (54) contained in the liquid crystal material. The difference between the ordinary and extraordinary indices of refraction of the liquid crystal material is between about 0.23 and 0.30. The liquid crystal material is dispersed in plural volumes in the containment medium. A pleochroic dye may be present in the liquid crystal material in a concentration of about 0.5% to 3.0%. The apparatus has enhanced backscattering in the field-off state and enhanced light transmission in the field-on state.

50 Claims, 4 Drawing Sheets

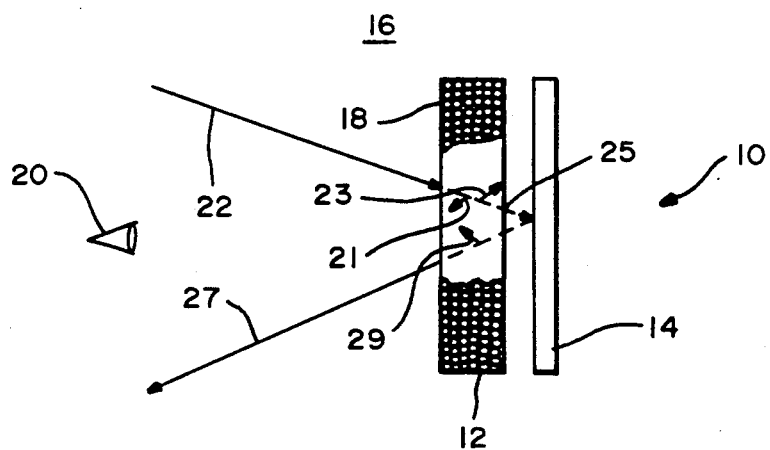
FIG.—1
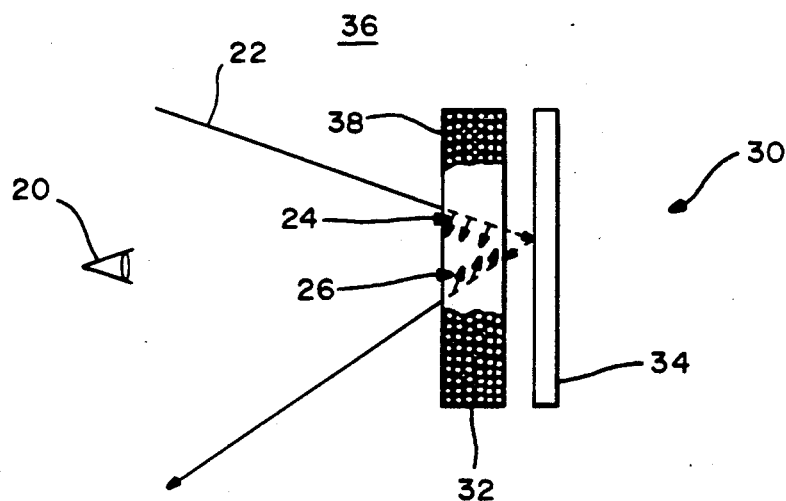
FIG.—2
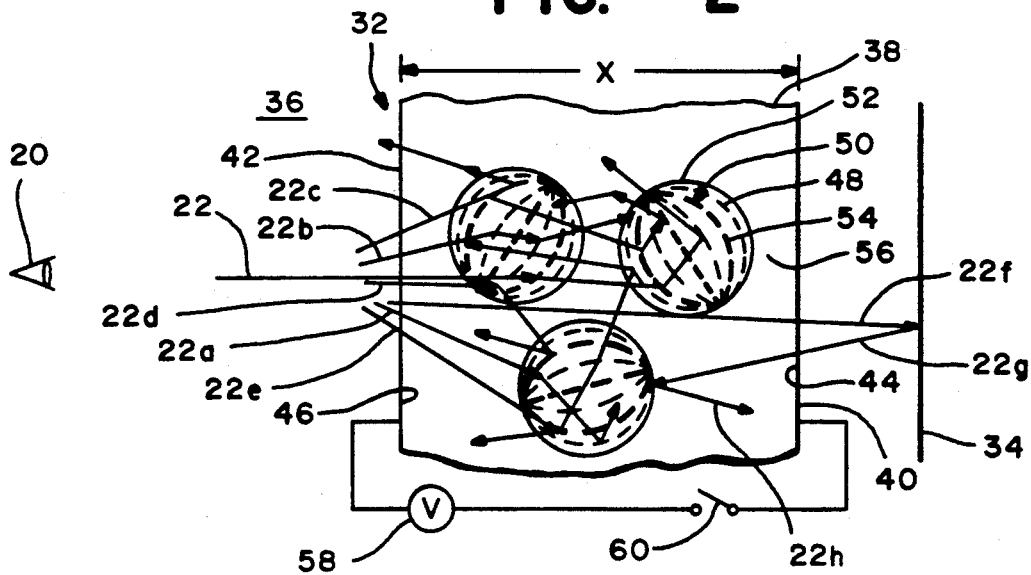
FIG.—3

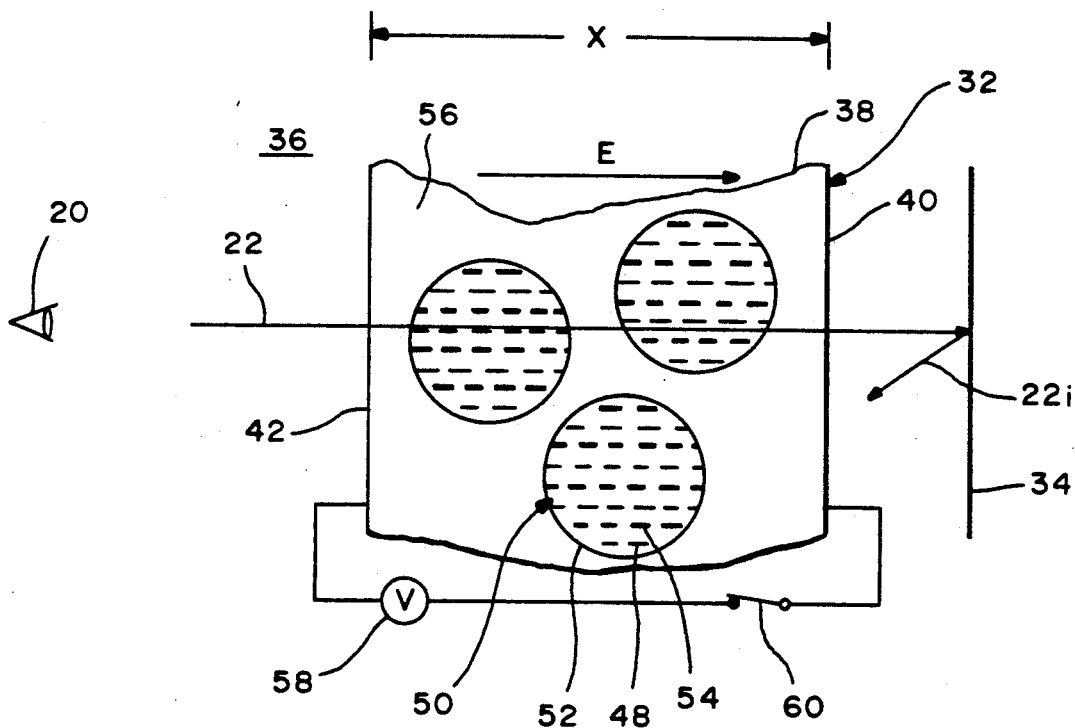
FIG.—4

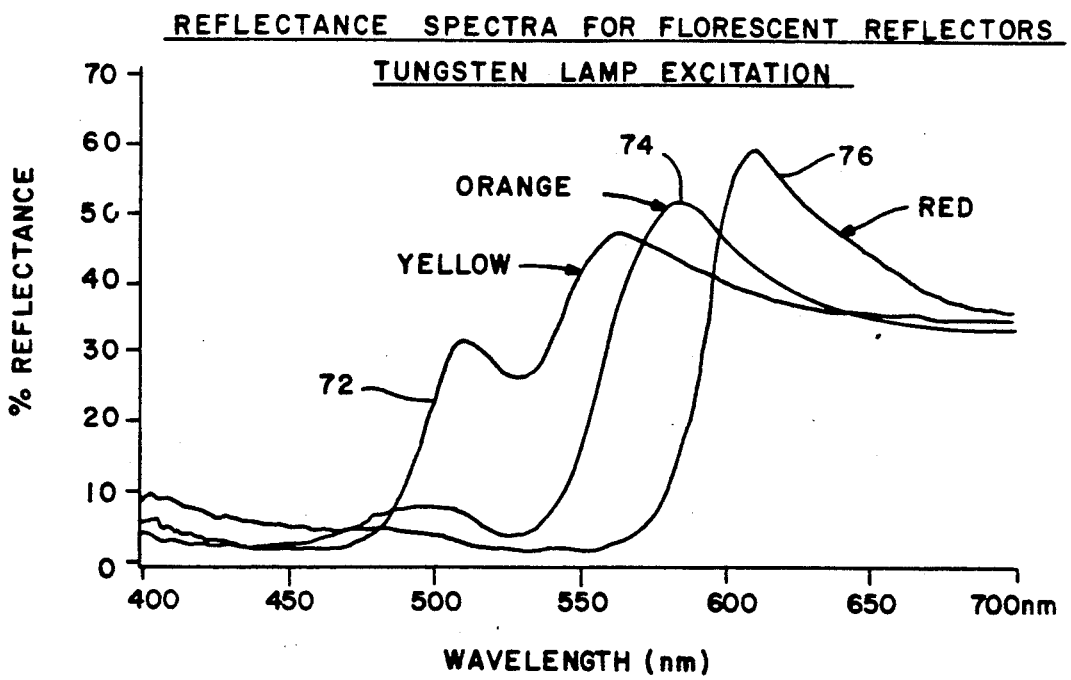
FIG.—5
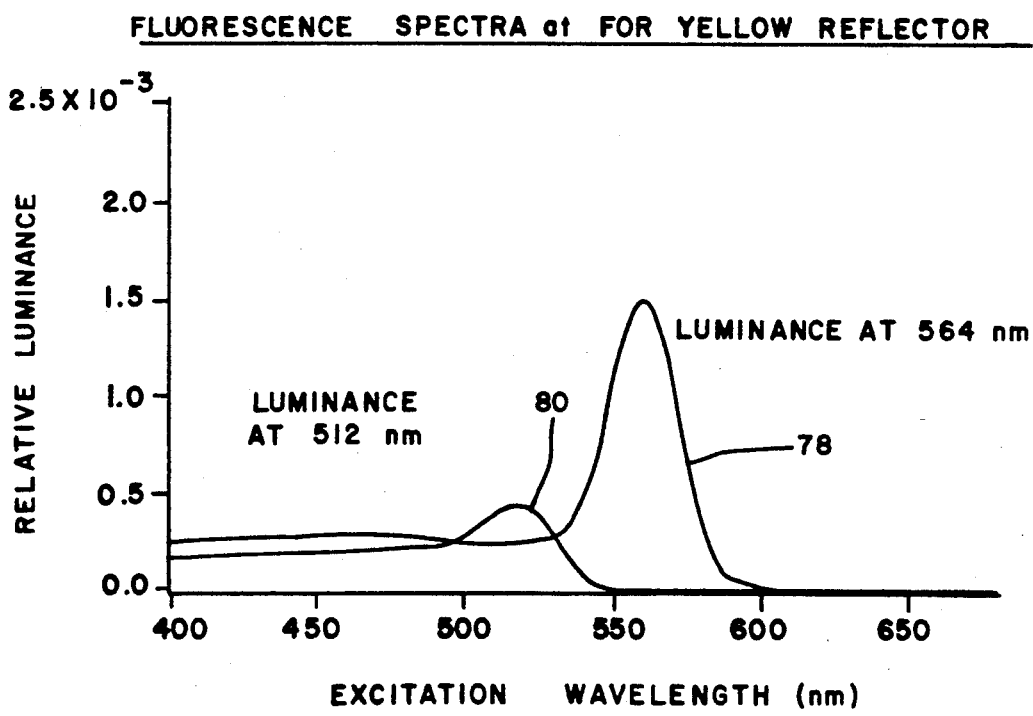
FIG.—6

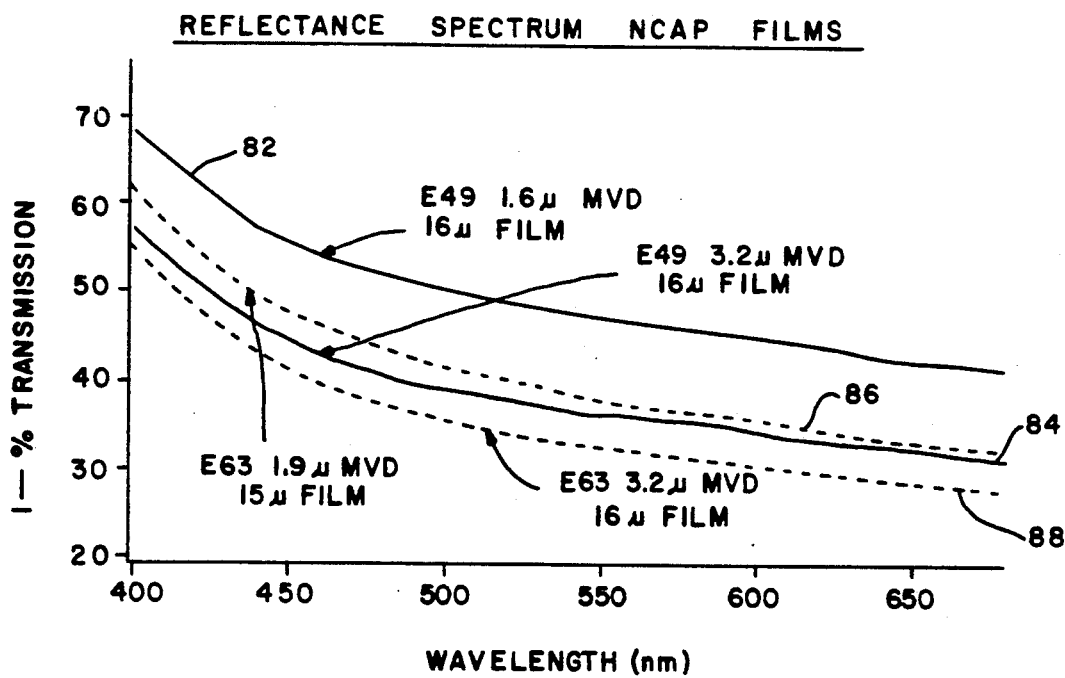
FIG.—7
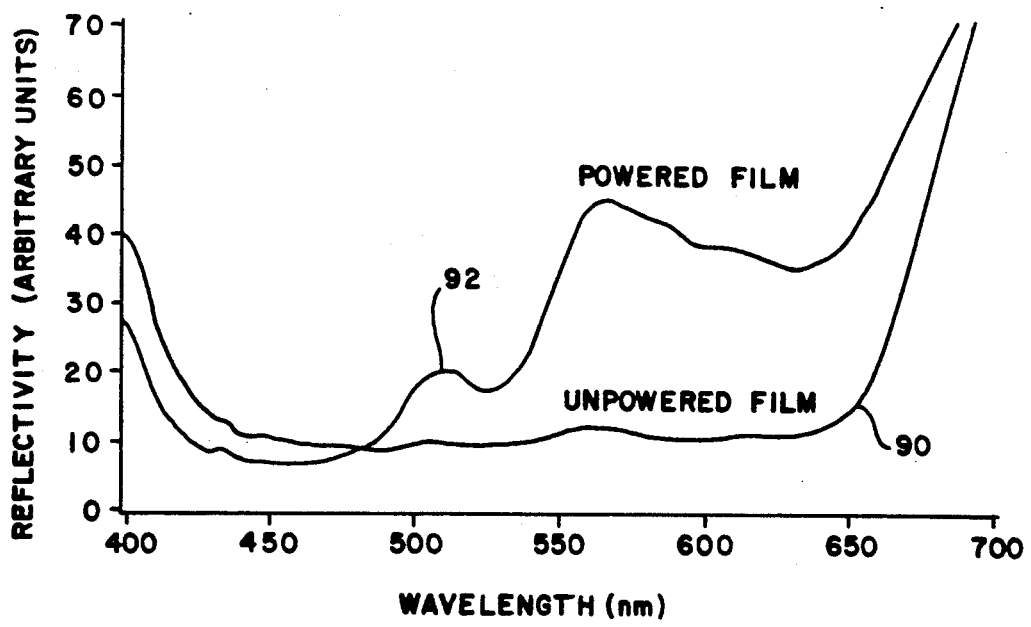
FIG.—8

POLYMER DISPERSED LIQUID CRYSTAL DISPLAY WITH BIREFRINGENCE OF THE LIQUID CRYSTAL AT LEAST 0.23

CROSS-REFERENCE TO RELATED APPLICATIONS

This application is a continuation-in-part of application Ser. No. 07/705,824, filed May 28, 1991 now abandoned; which is a continuation of application Ser. No. 07/490,643, filed May 23, 1990 now abandoned; which is a continuation-in-part of application Ser. No. 250,435, filed Sep. 28, 1988 now abandoned.

FIELD OF THE INVENTION

The present invention relates generally to liquid crystals, and more particularly to a guest host liquid crystal display having enhanced backscattering and light transmission.

BACKGROUND OF THE INVENTION

Liquid crystals are used in a wide variety of devices, including visual display devices. The property of liquid crystals that enable them to be used, for example, in visual displays, is the ability of liquid crystals to transmit light on the one hand and to scatter light and/or absorb it (especially when combined with an appropriate dye) on the other, depending on whether the liquid crystals are in a de-energized or field-off state, or in an energized or field-on state. An electric field selectively applied across the liquid crystals may be used to switch between the field-off and field-on states.

There are three categories of liquid crystals, namely cholesteric, nematic and smectic. The present invention relates in the preferred embodiment described hereinafter to the use of liquid crystal material which is operationally nematic. By "operationally nematic" is meant that, in the absence of external fields, structural distortion of the liquid crystal is dominated by the orientation of the liquid crystal at its boundaries rather than by bulk effects, such as very strong twists (as in cholesteric material) or layering (as in smectic material). Thus, for example, a liquid crystal material including chiral ingredients which induce a tendency to twist but which cannot overcome the effects of the boundary alignment of the liquid crystal material would be considered to be operationally nematic.

A more detailed explanation of operationally nematic liquid crystal material is provided in U.S. Pat. No. 4,616,903, issued Oct. 14, 1986, entitled ENCAPSULATED LIQUID CRYSTAL AND METHOD, assigned to Manchester R&D Partnership, the disclosure of which is hereby incorporated by reference. Reference may also be made to U.S. Pat. No. 4,435,047, issued Mar. 6, 1984, entitled ENCAPSULATED LIQUID CRYSTAL AND METHOD, assigned to Manchester R&D Partnership, and which disclosure is also hereby incorporated by reference.

Nematic curvilinear aligned phase (NCAP) liquid crystal and devices using NCAP liquid crystal are also described in the above-identified U.S. Pat. No. 4,435,047. An NCAP film may comprise a containment medium containing plural volumes of operationally nematic liquid crystal. The plural volumes may be discrete or interconnected capsules. As described in U.S. Pat. No. 4,707,080, issued Nov. 17, 1987, entitled ENCAPSULATED LIQUID CRYSTAL MATERIAL, APPARATUS AND METHOD, assigned to Manchester R&D Partnership, the disclosure of which is hereby incorporated by reference, the interconnecting channels or passageways may also contain liquid crystal material.

A functional NCAP liquid crystal device may consist of NCAP liquid crystal sandwiched between two electrode-coated substrates. A voltage source may be connected between the electrodes to selectively apply an electric field across the liquid crystal material. A pleochroic dye may be present with the liquid crystal material to provide substantial attenuation by absorption in the field-off state but to be substantially transparent in the field-on state.

An optical reflector may be located to the rear of the NCAP film. The reflector may be colored. Reflection by the device will b a function of whether there is an electric field applied across the liquid crystal material.

The optical performance of such a guest host display may be measured by comparing its luminance and color in the field-on and field-off states. The display's luminance (Y) is a quantitative measure of the intensity of light leaving the display surface. Its brightness is closely related to luminance but is not quantitative. The display's color may be represented by the Cartesian coordinates (x,y) on a 1931 C.I.E. chromaticity diagram.

Ideally, in the field-off state, the display's luminance should be low and its color as close to a colorless, neutral state as possible. In the field-on state, just the opposite is preferably true. The display's luminance should be high, and its color, which is dependent upon the reflector's color, should be very saturated.

As is known, the display may be made darker (lower luminance) in the field-off state by using a high concentration of dye or a thicker liquid crystal film. However, as a result for a given voltage, in the field-on state, the display is also darker and its color less saturated. Thus, although the optical performance of the display may be improved in the field-off state, it is no better, indeed it is worse, in the field-on state.

A potential solution to this problem has been the use of higher performance pleochroic dyes, i.e. dyes with a higher order parameter. However, even with such dyes there is a direct trade-off between the optical performance in the field-on and field-off states. That is, the optical performance in the field-off state cannot be improved without adversely affecting that performance in the field-on state and vice-versa. Thus, there is a limitation on the degree of color contrast and luminance that may be obtained in the field-on and field-off states.

Accordingly, an object of the present invention is to enhance the optical performance of a liquid crystal display wherein the display's field-off and field-on performances are more independent of each other.

A more specific object of the present invention is to provide a guest host display that has enhanced backscattering in the field-off state but enhanced light transmission in the field-on state.

Yet another object of the present invention is to provide a guest host display that has improved color contrast and luminance.

BRIEF SUMMARY OF THE INVENTION

A liquid crystal apparatus comprising a containment medium, a birefringent liquid crystal material and a pleochroic dye contained in the liquid crystal material. The difference between the ordinary and extraordinary indices of refraction of the liquid crystal material is between 0.23 and 0.30. The refractive index of the containment medium should be such that the difference between the extraordinary refractive index of the liquid crystal material and the refractive index of the polymer should be large, namely greater than 0.23. The liquid crystal material is dispersed in plural volumes in the containment medium and the mean size of those volumes are on the order of about 0.5 to 2.5 microns. The thickness of the containment medium may be between about 5 and 18 microns, and the pleochroic dye may be present in the liquid crystal material in a concentration of about 0.6% to 1.2% or between about 0.5% to 3.0%. The apparatus has enhanced backscattering in the field-off state and enhanced light transmission in the field-on state.

The pleochroic dye may be a blue dye and a fluorescent reflector may be disposed on a nonviewing side of the containment medium. This configuration provides superior color contrast between the field-on and field-off states. The color contrast is improved since the film scattering preferentially rejects the short wavelengths of light that would otherwise excite the fluorescent reflector. Additionally, in this configuration, a lower concentration of blue dye may be utilized, thereby increasing light transmission in the field-on state.

DESCRIPTION OF THE DRAWINGS

Additional features of the invention will be evident from the following description taken in conjunction with the accompanying drawings wherein:

FIG. 1 is a schematic view illustrating the operation of a prior art liquid crystal apparatus.

FIG. 2 is a schematic view illustrating the operation of a liquid crystal apparatus in accordance with the present invention.

FIG. 3 is a schematic view illustrating an apparatus made in accordance with the present invention in the absence of an electric field.

FIG. 4 is a schematic view illustrating an apparatus made in accordance with the present invention in the presence of an electric field.

FIG. 5 is a graphical representation of the reflectance spectra for three different fluorescent reflectors.

FIG. 6 is a graphical representation of the fluorescence spectrum for a yellow fluorescent reflector.

FIG. 7 is a graphical representation of the reflectance spectra of different NCAP films.

FIG. 8 is a graphical representation of the reflectance spectrum of an NCAP film in the field-off and field-on states.

DESCRIPTION OF THE PREFERRED EMBODIMENTS

Referring now to the drawings, wherein like reference numerals for like components are utilized throughout the drawings, attention is first directed to FIG. 1. FIG. 1 shows a liquid crystal display indicated generally by reference numeral 10. The display may be observed by an observer 20 at a viewing side 16 thereof.

The display includes a NCAP liquid crystal cell 12 disposed in front of a color reflector 14. The liquid crystal cell includes a liquid crystal material 18 having a pleochroic dye mixed therewith. The optical characteristics of the liquid crystal material are a function of whether a prescribed input is applied across the liquid crystal material. The prescribed input may be an electric field. The application or not of the electric field creates the display that is observable by observer 20.

In the field-off state, the dye and liquid crystal molecules are randomly aligned inside the volumes or capsules, and interconnecting passages, if present, of the containment medium. Ambient light, represented by light beam 22, is absorbed and isotropically scattered. Isotropic scattering is described in U.S. Pat. No. 4,606,611, issued Aug. 19, 1986, entitled ENHANCED SCATTERING IN VOLTAGE SENSITIVE ENCAPSULATED LIQUID CRYSTAL, assigned to Manchester R&D Partnership, which disclosure is hereby incorporated by reference. The light that is absorbed by the dye may be represented by light beam 23. Light that is forward scattered through the cell is represented by light beam 25. That light is reflected by reflector 14 back toward the cell where it will be forward scattered through the cell as light beam 27 and absorbed as light beam 29. Some of the incident light may also be backscattered as represented by light beam 21. The light that observer 20 sees ($B_{off}$) is a function of the light absorbed and scattered by the cell, which in turn determines the luminance (Y) and color (x,y) of the display.

In the field-on state, an electrical field is applied across the liquid crystal material in the cell. The ambient light 22 then passes through the cell and is not extensively absorbed by the dye, since the dye is now aligned parallel to the incoming light. As such, more of the ambient light reflects off and is colored by color reflector 14. This light may be represented as $B_{on}$ and is identified by the ray path shown by light beams 22, 25 and 27. As discussed, the optical performance of the display is evaluated by comparing $B_{off}$ and $B_{on}$, and the contrast ratio of the display is the ratio of $B_{on}$ to $B_{off}$.

FIG. 2 schematically represents the operation of display 30 of the present invention. This display includes a NCAP liquid crystal cell 32 disposed on a viewing side 36 in front of a reflector 34. The liquid crystal cell includes a NCAP liquid crystal material 38 having a pleochroic dye mixed therein. As will be explained in detail below, liquid crystal material 38 has been especially formulated to enhance the cell's backscattering and light transmissive properties. Thus, incident light, light beam 22 (not coming off the display at the glare angle) will not only be forward scattered by the liquid crystal material in the field-off state but will also be extensively backscattered, as represented generally by light beams 24 and 26. Additionally, more light will be transmitted through the display in the field-on state.

Such enhanced backscattering and light transmission provide a display that produces improved color, luminance and contrast between the field-on and field-off states. This enhancement in performance may be achieved with 15-33% less dye and lower operating voltages.

To explain more fully and as shown in FIGS. 3 and 4, liquid crystal cell 32 includes NCAP liquid crystal material 38 supported by and between substrates 40 and 42. The substrates have respective electrodes 44 and 46 formed thereon Mounting substrates 40 and 42, and electrodes 44 and 46 are optically transparent so that the liquid crystal cell is capable of controlling the transmission of light therethrough in response to an electric field applied across the liquid crystal material. The substrates may be a polyester material (PET) and the electrodes may be formed in any conventional manner from, e.g., indium tin oxide (ITO).

The NCAP liquid crystal material 38 includes liquid crystals 48 more or less contained within the confines of the interior volumes 50 of capsules 52. The volumes of the liquid crystals are dispersed throughout a three-dimensional matrix or containment medium 56. This matrix is preferably a latex containment medium of the type disclosed and described in U.S. patent application Ser. No. 171,135, filed Mar. 16, 1988, entitled LATEX ENTRAPPED LIQUID CRYSTAL COMPOSITION, METHOD AND APPARATUS, assigned to Taliq Corporation, which disclosure is hereby incorporated by reference.

As noted, the volumes of liquid crystal may be discrete or interconnected. The interconnecting passageways may also contain liquid crystals. All of the aspects and features of the present invention vis-a-vis individual, unconnected capsules are applicable to a matrix system wherein capsules are interconnected by one or more interconnecting passages. For the sake of convenience, the matrix is illustrated in only two dimensions and interconnecting passageways are not shown Preferably, liquid crystal 48 is a nematic or operationally nematic liquid crystal material having a positive dielectric anisotropy. The liquid crystal has mixed therewith a pleochroic dye 54. The dye may be an azo or anthraquinone type. The dye alignment follows the alignment of the liquid crystal 48.

A voltage may be applied to electrodes 44 and 46, and hence across the liquid crystal material from an AC or DC voltage source 58. The voltage source is connected to the electrodes by electrical leads and through a selectively closable switch 60. When the switch is closed, a voltage is applied across the electrodes causing liquid crystal molecules 48 and dye 54, which follows the orientation of the liquid crystal molecules, to align with the electric field "E" (FIG. 4), thereby becoming optically transmissive. When the switch is opened and no voltage is applied (FIG. 3), the liquid crystal material and dye scatter and absorb light as will be discussed below.

The index of refraction of the encapsulating or containment medium 56 and the ordinary index of refraction of liquid crystal 48 should be matched as much as possible when in the field-on state in order to avoid optical distortion due to refraction of incident light passing therethrough. This refractive index match should be within 0.05 refractive index units, and preferably within 0.03 refractive index units. However, when the liquid crystal is in the field-off state there should be a difference in the indices of refraction at the boundary of the liquid crystal and the wall of capsule 52; i.e., the extraordinary index of refraction of the liquid crystal should be greater than the index of refraction of the encapsulating medium. The difference between the ordinary and extraordinary refractive indices of the liquid crystal (known as the birefringence) should also be high. This causes refraction at the interface or boundary of the liquid crystal and the containment medium, and thus further scattering.

As long as the ordinary index of refraction of the liquid crystal material is closer to the index of refraction of the containment medium, than is the extraordinary index of refraction, a change in scattering will result when going from the field-on to field-off conditions, and vice versa.

Increased backscattering and forward scattering of incident light by the liquid crystal in the field-off state generally results when the difference ($\Delta N$) between the ordinary and extraordinary refractive index of the nematic 48 and the refractive index of the containment medium 56 is high. However, since it is generally desired to match the ordinary refractive index of the nematic with the refractive index of the containment medium, the birefringence of the nematic will be a good indicator of the ability of a film containing that nematic to scatter light. Thus, the liquid crystal utilized in the apparatus of the present invention should have the highest possible $\Delta N$. Also, it should possess an ordinary refractive index that approximately matches the refractive index of the containment medium. A preferred range for $\Delta N$ is on the order of between 0.23 and 0.30. A more specific range that is suitable is between about 0.23 and 0.26, and another more suitable range is between about 0.26 and 0.30. As is well known in the art, the index of refraction, the $\Delta N$ or birefringence of a liquid crystal material is measured at the so-called sodium D line, i.e. at a wavelength of light at about 589 nanometers. Thus, all refractive index and $\Delta N$ values provided herein, including those in the appended claims, are measured at a wavelength of 589 nanometers. An example of a liquid crystal with a high $\Delta N$ is Product No. E49 ($\Delta N=0.261$) available from BDH, Ltd., Poole, England.

Since the difference between the extraordinary refractive index of the liquid crystal and the refractive index of the containment medium is the proper figure of merit, it is possible that a lower birefringent ($\Delta N$) liquid crystal could scatter more strongly than a higher birefringent material if the difference between the extraordinary refractive index and the refractive index of the containment medium is larger in the case of the lower birefringent nematic than for the higher birefringent nematic. Such a case may arise if two different nematics have different solubility levels in the containment medium In general, absorption of a nematic into the containment medium will cause an increase in the refractive index of the containment medium. Thus, a lower birefringent nematic with a low solubility in the containment medium could in principle scatter more effectively than a high birefringent nematic with a high solubility in the containment medium. However, if solubility effects for two such liquid crystals are similar, then the birefringence will be a good indicator of the films' ability to scatter light.

The capsule or volume size may also be adjusted to increase backscattering and forward scattering in the field-off state. The capsules are generally spherical and have an average or mean diameter of between about 0.5 and 3.0 microns, preferably between about 0.5 and 2.5 microns, more preferably between about 1.0 and 2.0 microns, still more preferably between about 1.3 and 1.8 microns, and most preferably about 1.5 microns.

In NCAP guest host displays of the type shown in FIG. 1, the average capsule diameter has been on the order of about 3–4 microns. As noted, reducing the average or mean capsule or particle size to, e.g., about 1.5 microns increases forward scattering and backscattering in the field-off state.

In order to enhance optical performance of the display in the field-on state it has been found that the thickness "x" of the liquid crystal layer should be in between 6 and 18 microns, preferably between about 5 and 18 microns, and more preferably between about 13 and 16 microns, and most preferably between about 10 and 14 microns. Heretofore, the thickness of this layer as used in NCAP guest host displays was on the order of about 20 microns. By decreasing that dimension, the display has enhanced optical performance in the field-on state as light transmission through the cell is increased. This enhanced optical performance comes about because, given a fixed operating voltage, decreasing the cell dimension increases the field across the film. This increased field leads to improved alignment of the nematic within the film, increasing the transmission through the cell by reducing both the absorbance and the scattering of the film. That is, the luminance (Y) of the display should be higher and its color (x,y) closer to that of the true color of the reflector.

As mentioned, the alignment of dye 54 follows the alignment of liquid crystal 48. Therefore, when the liquid crystal structure is in distorted alignment, as illustrated in FIG. 3, the dye will provide a relatively substantial amount of light absorption. However, when the liquid crystal is in parallel alignment, as shown in FIG. 4, light absorption by the dye will be minimized. As the magnitude of the electric field is increased or decreased, the amount of distortion of the liquid crystal material will vary, and the amount of absorption by the dye will also vary. In NCAP guest host displays of the type illustrated in FIG. 1, the dye has been present on the order of about 1.5% of the amount of liquid crystal. By reducing this concentration to an optimal range of between about 0.8% and 1.2% of the amount of liquid crystal, field-on optical performance is improved as mentioned above. A concentration of dye in liquid crystal on the order of about 0.6% to 1.2% is also suitable. Additionally, a concentration of dye in liquid crystal on the order of about 0.5% to 3.0% is also appropriate. Generally speaking, azo dyes may be used in concentrations from 0.5% to 1.2%, and anthraquinone dyes in concentrations from 1.2% to 3.0%.

The transmission of light through a display is an important parameter in characterizing the display. The transmission T is defined as $$T = \frac{I}{I_0} \quad (1)$$

where $I_0$ is the intensity of light striking the display film and I is the intensity of light transmitted by the display film. Even though the NCAP devices described herein are reflective, transmission through the film may be used as the relevant parameter, as this measurement can be made in a very straightforward fashion.

It is well known that a quantity called the absorbance A can be defined in terms of the dye extinction coefficient $\epsilon$, the cell thickness b, and the dye concentration c.

$$A = \epsilon\, b\, c \quad (2)$$

The transmission T is related to the absorbance A by the following formula.

$$A = -\log(T) = \epsilon\, b\, c \quad (3)$$

Equation 3 show that the transmission through a film containing an absorbing dye is dependent on the dye extinction coefficient, the film thickness, and the dye concentration. It is well-know to those skilled in the art that a specified value for film transmission can be achieved in a number of ways through variation of these variables.

In the present invention, a preferred range of transmission levels is specified in the unpowered NCAP film. These transmission levels are designed to provide an optimum contrast and brightness for a NCAP reflective display. From the above discussion and equation 3, it can be seen that different combinations of dye extinction coefficient, film thickness, and dye concentration can be used to achieve identical transmission values for a film. Thus, for the purposes of the present invention, the preferred transmission values for the unpowered film are defined, realizing that these values may be achieved using a large number of different formulations.

For reflective displays incorporating black dyes, a preferred transmission range through the unpowered film may be between about 0.20 and 0.35, with the range 0.25 to 0.30 being the most preferred. Using readily available dichroic dye materials, this provides a film which has a transmission in the powered state of 0.60 to 0.85. It is always advantageous to have a powered state transmission as high as possible; the range 0.70 to 0.85 is practically achievable with readily available materials.

These values I and $I_0$ represent an average transmission across the visible wavelength range (400–700 nm).

As noted, it is often desirable to construct NCAP displays using a dye with a color other than black, i.e. blue, red, or yellow. In order to provide the best-looking display, it is often desirable to have a lower transmission (higher absorbance) through the film when using a non-black dye, compared to a black dye. This lower transmission produces a display with better viewing characteristics.

At the peak wavelength for a single colored dye, a useful transmission level in the unpowered film is in the range of 0.005 to 0.2, with a preferred range of 0.01 to 0.05. The transmission value for a colored dye is measured at the wavelength of the dye which shows the strongest absorbance (peak wavelength) rather than as a spectral average as for the black dye.

The use of a high $\Delta N$ liquid crystal material greater than or equal to 0.23, and a capsule size on the order of about 1.5 microns results in enhanced optical performance in the field-off state. That is, the luminance (Y) of the display is low, and the color of the display (x,y) is closer to the color-neutral state desired.

By reducing the dye concentration to between about 0.8% and 1.2% of the liquid crystal material and decreasing the thickness or cross-sectional dimension "x" of the liquid crystal layer to between about 13 and 16 microns, light transmission through the cell in tho field-on state is increased. Thus, the performance of the display in the field-on state is improved.

Importantly, adjusting the capsule size and $\Delta N$ of the liquid crystal as discussed improves the display's field-off performance without substantially degrading its field-on performance. Similarly, adjusting the dye concentration and cell thickness as described improves field-on performance without substantially adversely affecting the field-off performance. Thus, there is no longer a direct trade off in performance between the field-on and field-off states; i.e., the optical performance in one state may be enhanced without adversely affecting the performance in the other state.

FIG. 3 illustrates the operation of the display in the field-off state. As shown, ambient light, light beam 22, impinging upon liquid crystal cell 32 will be forward scattered, backscattered and absorbed. More specifically, incident light, such as light beams 22a and 22b, will be absorbed by dye 54 in the capsule volumes. Other light, such as light beams 22c, 22d, and 22e, will be backscattered, i.e., scattered back towards observer 20 on viewing side 36 of the display. Still other light such as light beam 22f will pass through liquid crystal cell 32 and be reflected by reflector 34 as light beam 22g back into the cell where it may be backscattered (light beam 22h) back towards reflector 34. Due to the use of a high ΔN liquid crystal material and relatively small capsule diameters, the backscattering effect is enhanced.

In the field-on state, as illustrated in FIG. 4, switch 60 is closed and the electric field "E" is applied across the liquid crystal material of the cell. Thus, liquid crystal molecules 48 and dye 54 align parallel to the electric field. In this condition, most of the ambient light, light beam 22, passes through the cell to reflect off the surface of reflector 34 as light beam 22i. In comparison to guest host designs utilized heretofore, more light passes through the cell if the dye concentration is made lower and the cell thinner. This results in an increase in brightness and color purity in the field-on state.

Table 1 below is a comparison of a guest host NCAP display used heretofore (FIG. 1) with the display of the present invention (FIG. 2). The prior display (FIG. 1) had the following parameters: cell thickness=20 microns, dye concentration=1.5%, ΔN=0.22, capsule size=3 to 4 microns. The display of the present invention (FIG. 2) had these parameters: cell thickness=15 microns, dye concentration=1.0%, ΔN=0.26, and capsule size=1.5 microns.

TABLE 1

|  | FIG. 1 Design | FIG. 2 Design |
|---|---|---|
| % Light Transmission (single pass) |  |  |
| Off | 20% | 16% |
| On (40 Vac) | 50% | 58% |
| On (60 Vac) | 58% | 68% |
| % Luminance (double pass) |  |  |
| Off | 5.5% | 7.5% |
| On (40 Vac) | 18% | 22% |
| On (60 Vac) | 20% | 24% |
| Color Purity |  |  |
| Off | 30% | 18% |
| On (40 Vac) | 60% | 70% |
| On (60 Vac) | 68% | 75% |
| Color Difference (1976 CIE-LUV) |  |  |
| @ 40 Vac | 45 | 55 |
| @ 60 Vac | 50 | 65 |

As can be seen from Table 1, with the display of the present invention, the transmission of light through the cell in the field-off state was decreased, while light transmission in the field-on state was increased. Although the luminance of the display of the present invention was higher in both the field-on and field-off states, the color in the field-off state was closer to the desired color-neutral condition. The display's color purity or saturation was also better in the field-on state. Also the color difference or contrast between the field-on and field-off states was improved.

The reflector 34 of display 30 may be a colored, fluorescent reflector. If so, as will be explained below, an additional effect occurs.

Fluorescent dyes used in fluorescent reflectors work by absorbing short wavelength light, e.g., blue and ultraviolet light (380 to 500 nanometers (nm)), and re-emitting that light at longer wavelengths, i.e., typically yellow, orange, and red light (500 to 700 nm). In this way, fluorescent materials often seem brighter than their surroundings through this ability to convert light from one color to another. Fluorescent reflectors exist that can be excited at wavelengths shorter than 380 nanometers. In the context of the present invention, such reflectors are less useful since an ultraviolet absorbing filter that absorbs light of wavelengths less than 380 nanometers may be incorporated into the display. However, a choice of a different UV-absorbing filter or its removal would extend the choice of fluorescent reflectors to those that can be excited in the wavelength range less than 380 nanometers.

This fluorescent effect is shown in FIGS. 5 and 6. FIG. 5 illustrates the reflectance spectra for three different reflectors used in NCAP displays, using white light to illuminate the displays. Specifically, curves 72, 74 and 76 represent the reflectance spectrum for yellow, orange and red fluorescent reflectors, respectively. It is seen in FIG. 5 that each color has a major peak (or peaks) where light is preferentially reflected. FIG. 6 shows the reflectance of the yellow reflector, monitored at the two peak luminance wavelengths, i.e., 564 nm (curve 78) and 512 nm (curve 80). It is seen from FIG. 6 that even if the reflector is illuminated with light at shorter wavelengths than 564 nm, it still emits light. However, light at wavelengths longer than 564 nm does not excite the film at all at 564 nm. Similar effects are seen for the peak at 512 nm.

As described above, NCAP films scatter and/or absorb light, and can reflect light before it reaches a back reflector. For a fluorescent reflector, this property also prevents short wavelength light from reaching the reflector, and exciting the fluorescent color. Thus, the apparent brightness of the unpowered film is reduced using fluorescent reflectors, as the scattering and absorbing effects inhibit the fluorescent effect of the reflector.

This reflectance property of different NCAP films is shown in FIG. 7. FIG. 7 plots 1-% transmission for undyed E49 and E63 (liquid crystal material product No. 263 available from BDH. Ltd., Poole, England) films. These spectra are measured using an integrated sphere to measure the diffuse transmission through the films; this data was then used to calculate 1-% transmission. This quantity is not exactly equal to percent reflection, due to some small absorbance by the ITO electrode layers. FIG. 7 also contains information concerning the film thickness and the mean volume diameter (MVD) of the capsules of the containment matrix. For example, curve 82 represents an NCAP film utilizing the E49 liquid crystal material discussed above wherein the MVD is 1.6 microns and the film thickness is about 16 microns.

As can be seen from FIG. 7, for the small droplet E49 film (curve 82), 40% to 70% of the light impinging on the film in the field-off state is scattered (forward and backscattered) and/or absorbed. Additionally, this effect is much larger in the short wavelength region of the spectrum (around 400 nm) than in the long wavelength region (around 700 nm). This is exactly the spectral region which should be rejected in the unpowered film, since these wavelengths excite the fluorescent reflector as described above.

The exact reflectance spectrum of a NCAP film is dependent on the liquid crystal extraordinary refractive index, the containment medium refractive index, the liquid crystal droplet size, and the film thickness. The E49 film (curve 82) with 1.6 micron MVD droplets is a preferred material for NCAP guest-host films. In comparison, FIG. 7 also shows the reflectance spectra of an E49 film with a larger droplet diameter (curve 84), and two films with a different liquid crystal (E63) at two different mean droplet diameters (curves 86 and 88). The E63 mixture possesses lower birefringence ($\Delta N=0.227$) than the E49 mixture ($\Delta N=0.251$), and thus does not scatter light as effectively. As can be seen with both types of liquid crystals, smaller droplets are more efficient at scattering light than larger droplets. Measurement of the difference between the extraordinary refractive index of the nematic and the refractive index of the containment medium in this case shows a difference of 0.279 for the E49 mixture and 0.240 for the E63 mixture.

FIG. 8 illustrates the effect of scattering on the reflectance spectrum of an NCAP display. The film includes the E49 liquid crystal with the black pleochroic dye M778 at a concentration of 1% by weight. This dye is available from Mitsui Toatsu, Inc., Tokyo, Japan. The capsules have a mean volume diameter (MVD) of 1.7 microns, and the film thickness is about 18 microns. In the unpowered state (curve 90), it is seen that the film is dark and neutral colored. The luminance is also low, and relatively flat over the 400-700 nm range. When the film is powered (curve 92), however, two effects appear. First, the luminance of the film increases dramatically as the dye absorbance decreases. Secondly, the film becomes colored yellow, because of the yellow fluorescent reflector, as is evident from the shape of the spectrum as shown by curve 92. This change in brightness and color results in a large color difference in the display between the powered and unpowered states.

As discussed, in the field-off state, the NCAP film minimizes the excitation of the fluorescent reflector by scattering and absorbing the shorter wavelengths of light, i.e. between about 380 and 500 nm. The result, as noted, is an improvement in color contrast between the field-on and field-off states.

The color contrast of such a display may be further improved by using a blue, pleochroic dye. The color contrast is improved for two reasons. First, in the field-off state, the backscatter of the film prevents a large fraction of the light from reaching the rear reflector. Thus, much of the reflection from the device will be the color of the pleochroic dye in the film (e.g., blue). Second, since the reflector is chosen to be a complementary or near complimentary color of the blue dye, i.e., yellow, red or orange, light that does reach the reflector and is reflected is preferentially absorbed by the blue dye as it passes through the NCAP film layer.

The NCAP display incorporating a blue dye would thus appear blue in color in the off state and have a green, yellow, orange, or red color in the on state, depending on the reflector utilized.

Exemplary blue dyes that may be utilized in the display of the present invention include M-137 and M-483 (available from Mitsui Toatsu, Inc., Tokyo, Japan), B-1 and B-3 (available from Hoffmann-La Roche Ltd., Basel, Switzerland), and D-102 (available from BDH Ltd., Poole, England). These dyes are oil soluble to provide solution thereof with the liquid crystal. Also, they are not subject to absorption by the water phase or polymer phase to insure that they will not be absorbed by the containment medium or any carrier medium during the manufacturing process. The dyes preferably are also photo-stable so that they do not fade significantly when exposed to sunlight. As such, they are suitable for use in outdoor displays. Preferably, the concentration of blue dye is between about 0.6% and 2.0% and more preferably between about 1.0% and 1.5%.

EXAMPLE 1

A method may comprise mixing together 67.6 grams of the liquid crystal E49 (available through BDH, Ltd., Poole, England) with 1.01 grams of pleochroic blue dye M-137 (an anthraquinone dye available through Mitsui Toatsu, Inc., Tokyo, Japan) with stirring at a temperature between 50° C. and 100° C. until the dye is completely dissolved into the liquid crystal. The $\Delta N$ of the liquid crystal material at 25° C. is 0.261, and its ordinary refractive index is 1.527. Thereafter, 0.04 grams of surfactant IGEPAL CO-610 (available through GAF, Inc., Wayne, N.J.) can be added to the mixture and blended for 2-3 minutes at 500 RPM. A mixer suitable for this and subsequent mixing is a Dyna-Mix variable speed rotary mixer (available from Fisher Scientific Inc., Pittsburgh, Pa.). About 0.02 grams of the surfactant DOW-5098 (available from Dow Chemical, Midland, Mich.) may also be added during the emulsification for defoaming. Thereafter, 41.6 grams of Neorez R-967 (available through Polyvinyl Chemicals, Wilmington, Mass.) containing 40% of latex particles by weight can be added into the emulsified mixture and mixed for one minute at about 6000 RPM until the mixture is homogeneous. The preferred mean volume diameter of the capsules is about 1.5 microns, as determined using a Coulter Counter Model TAII particle size analyzer (available from Coulter Electronics, Inc., Hialeah, Fla.). The mixture may be degassed and 0.12 grams of the crosslinking agent CX-100 (available through Polyvinyl Chemicals, Wilmington, Mass.) may be added with slow mixing. This material may then be layered with a 0.003" Bird doctor blade or other suitable means onto an appropriate electrode-coated substrate and dried. Additionally, a second electrode-coated substrate may be laminated to the coating to make an operating device.

The index of refraction of the containment medium is about 1.482 prior to contact with the liquid crystals, but rises to about 1.509 as the liquid crystal becomes partially absorbed by the containment medium. Due to this increase, the refractive index of the containment medium becomes reasonably well-matched to the ordinary refractive index of the E49 nematic (1.527). An exact match of refractive indices is not necessary for these display devices. In this case, the difference in refractive index between the containment medium and ordinary refractive index of the nematic of 0.018 results in sufficient clarity in the powered film to easily discern the colored reflector behind the NCAP film.

EXAMPLE 2

Other colored dyes may also be used, for example, a black dye mixture D103 (available from E. Merck, Darmstadt, Germany). This dye mixture is dissolved in E49 liquid crystal at a concentration between 1.2% and 2.5% (preferred concentration is 2%). All other aspects of the device structure may be the same.

EXAMPLE 3

An azo blue dye, 90-573, available from E. Merck, could also be used. This is purchased as a dye/liquid crystal mixture, with the dye dissolved in E49 at 1% concentration. The preferred range of this dye is between 0.5% and 1.0% with the preferred concentration being 0.7%. Other aspects of the display may be the same. Other blue azo dyes having concentration ranges between 0.5% and 1.2% for reflective displays can also be used.

Other black dye examples in accordance with the present invention include the following:

EXAMPLE 4

A 1.0% M778 dye mixture (available from Mitsui Toatsu) in E49 and dispersed in the Neorez R-9677 polymer (available through Polyvinyl Chemicals). The ratio of the liquid crystal to polymer is about 1.5. The preferred coating thickness is 15±2 microns.

EXAMPLE 5

A 2.0% M778 dye mixture in the E49 liquid crystal and dispersed in the R-9677 polymer. The ratio of liquid crystal to polymer is about 1.5. The preferred coating thickness is 7±1 microns.

EXAMPLE 6

A 1.2% dye M778 dye mixture in the E49 liquid crystal and dispersed in the R-9677 polymer. The ratio of liquid crystal to polymer is about 1.0. The preferred coating thickness is 15±2 microns.

Other colored dye examples include:

EXAMPLE 7

A 1.7% M137 blue dye (available from Mitsui Toatsu with an extinction coefficient of 50 liter/g-cm@640 nm) in the E49 liquid crystal. This dye-nematic solution may be dispersed in the R-9677 polymer. The ratio of liquid crystal to polymer is about 1.5. The preferred coating thickness is 15±2 microns. A reflective device may incorporate an orange or a yellow fluorescent reflector.

EXAMPLE 8

A 1.1% SI-426 red dye (available from Mitsui Toatsu with an extinction coefficient of 80 liter/g-cm@520 nm) in the E49 liquid crystal. This dye-nematic solution may be dispersed in the R-9677 polymer. The ratio of liquid crystal material to polymer is about 1.5. The preferred coating thickness is 15±2 microns. A reflective device may incorporate a green fluorescent reflector.

EXAMPLE 9

A 2.2% SI-486 yellow dye (available from Mitsui Toatsu and with an extinction coefficient of 80 liter/g=cm@400 nm) in the E49 liquid crystal. This dye-nematic solution may be dispersed in the R-9677 polymer. The ratio of liquid crystal to polymer is about 1.5. A preferred coating thickness is 7±1 microns. A reflective device may incorporate a blue fluorescent reflector.

As can be seen, if the NCAP film includes a red dye, a complimentary color reflector, i.e. a green reflector, may used to improve the color contrast between the field-on and field-off states. Similarly, a complimentary blue fluorescent reflector may be used with a NCAP film incorporating a yellow dye.

Although certain specific embodiments of the invention have been described herein in detail, the invention is not to be limited only to such embodiments, but rather only by the appended claims.

We claim:

1. A liquid crystal apparatus comprising: a containment medium, a birefringent liquid crystal material wherein the difference between the ordinary and extraordinary indices of refraction of said liquid crystal material is greater than or equal to about 0.23, said liquid crystal material dispersed in plural volumes in said containment medium and a pleochroic dye contained in said liquid crystal material that conforms to the structure thereof.

2. The apparatus of claim 1 wherein the concentration of said dye in said liquid crystal material is between about 0.5% and 3.0%.

3. The apparatus of claim 2 wherein the thickness of said containment medium is between about 5 and 18 microns.

4. The apparatus of claim 3 wherein the mean size of said volumes is between about 0.5 and 2.50 microns.

5. The apparatus of claim 1 wherein a reflector means is disposed on a nonviewing side of said containment medium.

6. The apparatus of claim 1 wherein the difference the ordinary and extraordinary indices of refraction is between about 0.23 and 0.30.

7. The apparatus of claim 6 wherein the difference between the ordinary and extraordinary indices of refraction is between about 0.26 and 0.30.

8. The apparatus of claim 1 further including electrode means for applying an electric field across said liquid crystal material, substrate means for supporting said electrode means, and circuit means for controlling the application of said electric field.

9. A liquid crystal apparatus comprising: a containment medium, a birefringent liquid crystal material wherein the difference between the ordinary and the extraordinary indices of refraction of said liquid crystal material is greater than or equal to about 0.23, said liquid crystal material dispersed in plural volumes in said containment medium wherein said volumes have a mean size from about 0.5 to 3.0 microns, the thickness of said containment medium between about 8 and 18 microns, and a pleochroic dye contained in said liquid crystal material that conforms to the structure thereof wherein the concentration of said dye in said liquid crystal material is on the order between about 0.6% and 1.2%.

10. A liquid crystal apparatus comprising: a containment medium, a birefringent liquid crystal material wherein the difference between the ordinary and extraordinary indices of refraction of said liquid crystal material is greater than or equal to about 0.23, said liquid crystal material dispersed in plural volumes in said containment medium wherein said volumes have a mean size from about 0.5 to 2.5 microns, the thickness of said containment medium between about 8 and 18 microns, and a pleochroic dye contained in said liquid crystal material that conforms to the structure thereof wherein the concentration of said dye in said liquid crystal material is on the order of between about 0.6% and 1.2%.

11. The apparatus of claim 10 wherein a reflector means is disposed on a non-viewing side of said containment medium.

12. The apparatus of claim 10 wherein the concentration of said dye is between about 0.8% and 1.2%.

13. The apparatus of claim 12 wherein the thickness of said containment medium is between 13 and 16 microns.

14. The apparatus of claim 13 wherein the difference between the ordinary and extraordinary indices of refraction is between about 0.23 and 0.30.

15. The apparatus of claim 14 wherein the difference between the ordinary and extraordinary indices of refraction is between about 0.26 and 0.30.

16. The apparatus of claim 14 wherein the mean size of said volumes is between about 1.3 and 1.8 microns.

17. The apparatus of claim 10 wherein said liquid crystal material and said containment medium cooperate to backscatter, absorb and transmit light incident thereon independently of the polarization of such incident light.

18. The apparatus of claim 17 wherein said volumes are formed in said containment medium in a three dimensional matrix.

19. The apparatus of claim 10 wherein said liquid crystal material is operationally nematic liquid crystal material having a positive dielectric anisotropy.

20. The apparatus of claim 10 further including electrode means for applying an electric field across said liquid crystal material.

21. The apparatus of claim 20 further including substrate mean for supporting said electrode means.

22. The apparatus of claim 21 further including circuit means for controlling the application of said electric field.

23. A liquid crystal apparatus comprising: a containment medium, a birefringent liquid crystal material wherein the difference between the ordinary and extraordinary indices of refraction of said liquid crystal material is between about 0.23 and 0.30, said liquid crystal material dispersed in plural volumes in said medium wherein said volumes have a mean volume diameter of between about 0.5 and 2.5 microns, said medium producing a generally distorted alignment of said liquid crystal material which in response to such alignment at least one of scatters and absorbs light and which in response to an electrical field reduces the amount of such scattering or absorption, said medium having a thickness between about 5 and 18 microns, and a pleochroic dye contained in said liquid crystal material that conforms to the structure thereof with the concentration of said dye in said liquid crystal material on the order of between about 0.5% and 3.0%.

24. The apparatus of claim 23 wherein the difference between the ordinary and extraordinary indices of refraction of said liquid crystal material is between about 0.26 and 0.30.

25. The apparatus of claim 24 wherein the thickness of said medium is between about 10 and 14 microns.

26. A liquid crystal apparatus comprising: a containment medium, a birefringent liquid crystal material wherein the difference between the ordinary and extraordinary indices of refraction of said liquid crystal material is between about 0.23 and 0.30, said liquid crystal material dispersed in substantially spherical capsules in said medium wherein said capsules have a mean diameter of between about 0.5 and 2.5 microns, said medium producing a generally distorted alignment of said liquid crystal material which in response to such alignment at least one of scatters and absorbs light and which in response to an electrical field reduces the amount of such scattering or absorption, electrode-coated substrate means for applying said electric field and said medium disposed therebetween and having a thickness between about 8 and 18 microns, and a pleochroic dye contained in said liquid crystal material that conforms to the structure thereof with the concentration of said dye in said liquid crystal material on the order of between about 0.6% and 1.2%.

27. The apparatus of claim 26 further including a reflector means disposed on a non-viewing side of said medium.

28. The apparatus of claim 27 wherein the difference between the ordinary and extraordinary indices of refraction of said liquid crystal material is between about 0.26 and 0.30.

29. The apparatus of claim 26 wherein the concentration of said dye is between about 0.8% and 1.2%.

30. The apparatus of claim 29 wherein the thickness of said containment medium is between about 13 and 16 microns.

31. The apparatus of claim 30 wherein the diameter of said capsules is between about 1.3 and 1.8 microns.

32. A liquid crystal apparatus comprising: a containment medium, a birefringent liquid crystal material wherein the difference between the ordinary and extraordinary indices of refraction of said liquid crystal material is greater than or equal to about 0.23, said liquid crystal material dispersed in plural volumes in said containment medium wherein said volumes have a means volume diameter from about 0.5 to 2.5 microns, the thickness of said containment medium between about 8 and 18 microns, a blue pleochroic dye contained in said liquid crystal material that conforms to the structure thereof wherein the concentration of said dye in said liquid crystal material is on the order of between about 0.6% and 2.0%, and a fluorescent reflector disposed on a non-viewing side of said containment medium.

33. The apparatus of claim 32 wherein the concentration of said dye is between about 1.0% and 1.5%.

34. The apparatus of claim 33 wherein the thickness of said containment medium is between 13 and 16 microns.

35. The apparatus of claim 34 wherein the difference between the ordinary and extraordinary indices of refraction is between about 0.23 and 0.30.

36. The apparatus of claim 35 wherein the difference between the ordinary and extraordinary indices of refraction is between about 0.26 and 0.30.

37. The apparatus of claim 36 wherein the mean volume diameter of said volumes is between about 1.3 and 1.8 microns.

38. The apparatus of claim 32 wherein said liquid crystal material and said containment medium cooperate to backscatter, absorb and transmit light incident thereon independently of the polarization of such incident light.

39. The apparatus of claim 38 further including electrode means for applying an electric field across said liquid crystal material.

40. The apparatus of claim 39 further including substrate means for supporting said electrode means.

41. The apparatus of claim 40 further including circuit means for controlling the application of said electric field.

42. A display comprising: a containment medium, a birefringent liquid crystal material wherein the difference between the ordinary and extraordinary indices of refraction of said liquid crystal material is greater than or equal to about 0.23, said liquid crystal material dispersed in plural volumes in said containment medium, a pleochroic dye contained in said liquid crystal material that conforms to the structure thereof, and a fluorescent reflector disposed on a non-viewing side of said containment medium, the color of said dye and said reflector selected to be substantially complementary to each other to enhance the contrast of the display.

43. The apparatus of claim 42 wherein the concentration of said dye in said liquid crystal material is between about 0.5% and 3.0%.

44. The apparatus of claim 43 wherein the thickness of said containment medium is between about 5 and 18 microns.

45. The apparatus of claim 44 wherein the difference between the ordinary and extraordinary indices of refraction is between about 0.26 and 0.30.

46. A display, comprising:
a liquid crystal material;
a containment medium for containing plural volumes of said liquid crystal material, said medium producing a distorted alignment of said liquid crystal material which at least one of scatters and absorbs light and which in response to a prescribed input reduces the amount of such scattering or absorption;
a blue pleochroic dye contained in said volumes with said liquid crystal material to conform to the structure thereof, said dye blocking the transmission of light at wavelengths between 550 and 650 nanometers in the absence of said prescribed input; and a fluorescent reflector disposed on a nonviewing side of said medium.

47. The display of claim 46 wherein said dye is present in said liquid crystal material at a concentration of between about 0.50 and 2.0 percent.

48. The display of claim 46 wherein said reflector emits yellow, orange or red light.

49. A method of making a liquid crystal apparatus, comprising: forming a plurality of volumes of a birefringent liquid crystal material and a pleochroic dye that conforms to the structure thereof in a containment medium such that the walls of said volumes produce a distorted alignment of said liquid crystal material which in response to such alignment at least one of scatters and absorbs light and which in response to an electric field reduces the amount of such scattering or absorption, and selecting said liquid crystal material such that the difference between its ordinary and extraordinary indices of refraction is greater than or equal to about 0.23.

50. A method of making a liquid crystal apparatus, comprising: forming a plurality of volumes of a birefringent liquid crystal material and a pleochroic dye that conforms to the structure thereof in a containment medium such that the walls of said volumes produce a distorted alignment of said liquid crystal material which in response to such alignment at least one of scatters and absorbs light and which in response to an electric field reduces the amount of such scattering or absorption wherein said volumes have a mean size of between about 0.5 and 2.5 microns, selecting said liquid crystal material such that the difference between its ordinary and extraordinary indices of refraction is greater than or equal to about 0.23 wherein the concentration of said pleochroic dye in said liquid crystal material is on the order of between about 0.6% and 1.2%, and forming said containment medium to have a thickness of between about 8 and 18 microns.

* * * * *

UNITED STATES PATENT AND TRADEMARK OFFICE
CERTIFICATE OF CORRECTION

PATENT NO. : 5,206,747
DATED : Apr. 27, 1993
INVENTOR(S) : Richard C. Wiley, et al It is certified that error appears in the above-indentified patent and that said Letters Patent is hereby corrected as shown below:

On the title page, item [57] Abstract, line 4, insert --.-- after "material".

In column 2, line 16, delete "b" and insert --be--.
In column 4, line 61, insert --.--. after "thereon".
In column 5, line 21, insert --.-- after "shown".
In column 6, line 37, insert --.-- after "dium".
In column 7, line 59, delete "show" and insert --shown--.
In column 7, line 62, delete "well-know" and insert --well-known--.
In column 8, line 47, delete "tho" and insert --the--.

Signed and Sealed this

Twenty-second Day of February, 1994

Attest:

BRUCE LEHMAN

*Attesting Officer*   *Commissioner of Patents and Trademarks*